UNITED STATES PATENT OFFICE.

WILLIAM T. BUCHANAN, OF BONHAM, TEXAS.

IMPROVEMENT IN COMPOUNDS FOR DESTROYING TREES, ROOTS, &c.

Specification forming part of Letters Patent No. 220,799, dated October 21, 1879; application filed August 27, 1879.

*To all whom it may concern:*

Be it known that I, WILLIAM T. BUCHANAN, of Bonham, in the county of Fannin and State of Texas, have invented certain new and useful Improvements in Compounds for Destroying the Body, Branches, and Roots of Trees, &c.; and I do hereby declare that the following is a full, clear, and exact description of the invention, which will enable others skilled in the art to which it appertains to make and use the same.

This invention relates to an improved compound for destroying the body, branches, and roots of trees, bushes, and sprouts; and it consists of the following ingredients, in about the proportions named: copperas, two ounces; blue-stone, two ounces; tartaric acid, one-half ounce; arsenic, one-fourth ounce; water, one pint; and sulphuric acid, one-fourth gill.

The quantity of each ingredient may be varied if there should be a larger or smaller quantity of the compound desired, the proportion remaining the same.

The compound is mixed in the following manner: Take one pint of water, (rain-water is preferred,) then pulverize each of the ingredients, and dissolve them in the water. Shake well, and it is ready for application.

After the compound has been prepared it can be rendered more effective by the addition of one-fourth of a gill of sulphuric acid to the one pint of the compound.

The compound is applied in the following manner: For trees, take a sharp instrument and cut into them in several places at or near the ground, and apply the compound to the cut places. For bushes, cut them off near the ground, and apply the compound to the stump— *i. e.*, on top of it. For sprouts that have been grubbed, it is necessary to go down far enough to get below the dead wood and apply to the roots or sound wood above the roots. If the sprouts have not been grubbed, it is sufficient to cut them off at or near the top of the ground and apply to the stumps.

This compound has been thoroughly tested, and when mixed and applied substantially as set forth is very efficient in use.

Having thus fully described my invention, what I claim as new, and desire to secure by Letters Patent, is—

A compound for destroying trees, bushes, sprouts, &c., composed of copperas, blue-stone, tartaric acid, arsenic, sulphuric acid, and water, in about the proportions named, for the purpose specified.

In testimony that I claim the foregoing as my own I have hereto affixed my signature in presence of two witnesses.

WILLIAM T. BUCHANAN.

Witnesses:
 L. B. JOHNSON,
 ZAC SMITH.